Nov. 2, 1965   H. K. PRICE   3,215,372
SPACE CRAFT PROPULSION MEANS
Filed July 12, 1962   6 Sheets-Sheet 1

INVENTOR
HOLLAS K. PRICE
BY *Munson H. Lane*
ATTORNEY

Nov. 2, 1965    H. K. PRICE    3,215,372
SPACE CRAFT PROPULSION MEANS
Filed July 12, 1962    6 Sheets-Sheet 2

INVENTOR
HOLLAS K. PRICE
BY Munson H. Lane
ATTORNEY

United States Patent Office 3,215,372
Patented Nov. 2, 1965

3,215,372
SPACE CRAFT PROPULSION MEANS
Hollas K. Price, Box 701, Oak Hill, W. Va.
Filed July 12, 1962, Ser. No. 209,816
16 Claims. (Cl. 244—74)

This invention relates to new and useful improvements in space craft, that is, craft adapted for orbital and/or interplanetary flights, and the principal object of the invention is to facilitate extended space flights while maintaining maneuverability and ability to re-enter and land in a controlled manner under the craft's own power.

At the present time space craft used for sub-oribtal or orbital flights are boosted aloft by expendable rocket engines and when these engines are expended, such craft have no propulsion facilities of their own. In orbital travel their flight is sustained as a result of the thrust initially imparted to them by the rocket engines in the delicate balance between centrifugal and gravitational forces, while upon re-entry they are subject to haphazard landings under gravity alone, with nothing but parachutes to cushion their descent. Moreover, since the entire power supply afforded by the rocket booster is exhausted in bringing the craft aloft, the flight of any one particular craft is necessarily restricted to a particular trajectory or orbit, with not power facilities being available (apart from very limited steering and braking facilities) for materially altering the intended course of travel after the craft has been launched. As such, present day space craft leave much to be desired from the standpoint of powered flight with controlled maneuverability, which has long been recognized as indispensable in conventional aircraft.

The present invention seeks to eliminate the various disadvantages of present day space craft as above outlined, this being attained by the provision of a space craft which combines the advantages of a rocket vehicle with powered flight facilities of an airplane. Briefly, the space craft in accordance with the invention is equipped with jet engines, under the power of which the craft may take off the ground in the manner of an airplane and reach the upper layers of the atmosphere. At that point the jet engines may be shut off, and one of a plurality of rocket engines stored in the fuselage of the craft may be energized to boost the craft into a selected orbit or along a desired trajectory, which the craft will follow after the rocket engine has burned out. As the burned out rocket engine is jettisoned from the fuselage, another takes its place in readiness to be energized whenever it is desired to boost the craft into another orbit or along another trajectory. This procedure may be repeated as long as a supply of rocket engines exists in the fuselage, the last engine in the supply being utilized for returning the craft to the earth's atmosphere, whereupon the aforementioned jet engines are again energized to effect a power controlled landing. The craft in accordance with the invention is also equipped with a wing and tail empennage for flight sustentation through the atmosphere; with thrust producing means for steering purposes both in the atmosphere and in space; and with a landing gear to facilitate take off and landing.

In present day space flights, most of the power of rocket boosters is expended at lift off and in travel through the lower, dense atmospheric layers, so that very little power remains for placing the space vehicle into an orbit or on a given trajectory, and no power remains for additional boosting purposes when that orbit or trajectory is attained. However, since the craft in accordance with the invention is brought by jet engines into the upper atmospheric regions, the full power of the rocket engine boost is available at that point for directing the craft along a desired flight path, and additional rocket engines boosts are also available when the course of flight is to be altered and when the craft ultimately is to return to the earth, whereupon power controlled landing is effected by wing sustentation and jet engine propulsion, as already noted.

Other objects, features and advantages of the invention will become apparent from the following description taken in conjunction with the accompanying drawings, wherein like characters of reference are used to designate like parts, and wherein.

Referring now to the accompanying drawings in detail, more particularly to FIGURES 1-8 inclusive, the space craft in accordance with the invention is designated generally by the reference numeral 30 and embodies in its construction an elongated, tubular fuselage 31 which is provided at its forward end with a hollow nose cone 32 wherein computers, sensing devices and various other instruments may be contained. Amidships, the fuselage is provided with a delta wing 33, while the rear or tail end portion of the fuselage is equipped with tail empennage, including vertical and horizontal stabilizers 34, 35, respectively. If desired, the tail empennage may be equipped with elevators and a rudder, while ailerons may be provided on the wing, in accordance with conventional aircraft practice.

A pair of main landing gear units 36 are provided under the wing 33 and a tail wheel unit 37 is provided under the tail of the fuselage, these being rectractable in the conventional manner and constituting a permanent landing gear which is available for take off as well as for landing. In addition, an auxiliary landing gear unit 38 may be provided between the units 36 to carry the weight of the craft at take off, the auxiliary unit 38 being jettisoned when the craft becomes airborne.

An annular engine nacelle 39 encircles the fuselage 31 amidships, substantially flush with the rear edge of the wing 33, and contains a plurality of circumferentially spaced jet engines 40. A frustoconical casing 41 encircles the fuselage immediately in front of the tail empennage 34, 35, and contains a plurality of circumferentially spaced, laterally discharging steering jets 42. Two or more jet engines 43 are provided on the rear edge portion of the wing 33 to assist the jet engines 40 in propulsion of the craft. The rear edge portion of the wing 33 also carries a pair of steering rocket guns 44, oriented rearwardly and outwardly from the fuselage.

Figure 1:
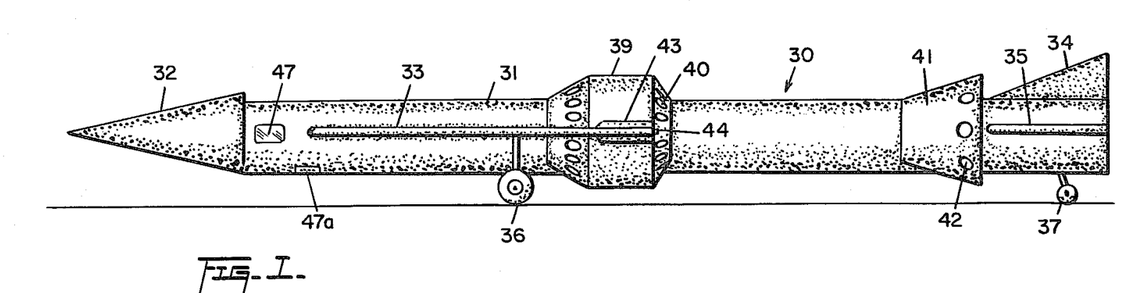
FIGURE 1 is a side elevational view of a space craft in accordance with the invention.
Figures 2, 3:
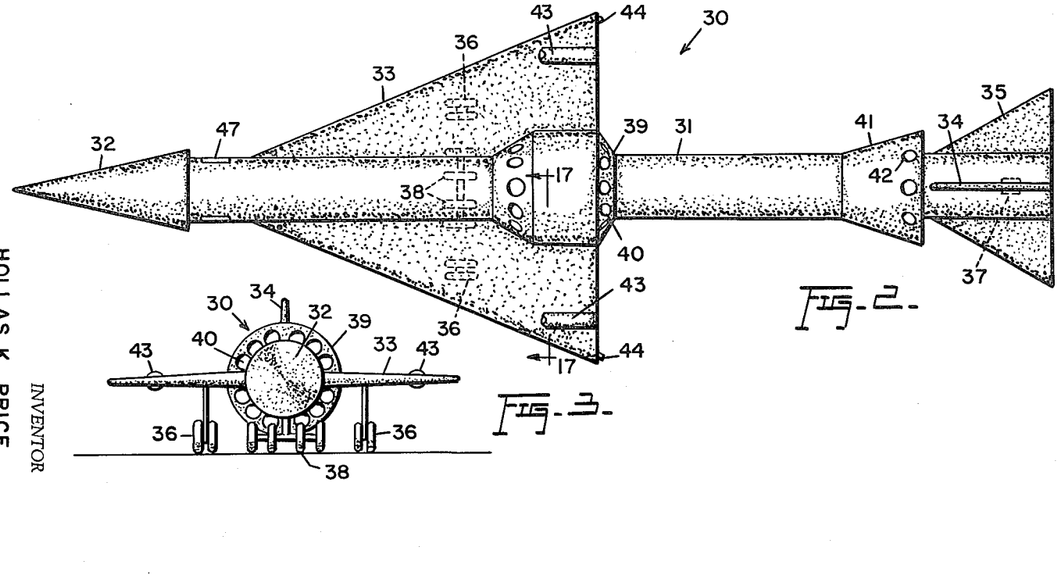
FIGURE 2 is a top plan view thereof.
FIGURE 3 is a front end view.
Figures 4, 5, 6, 7, 8, 9:
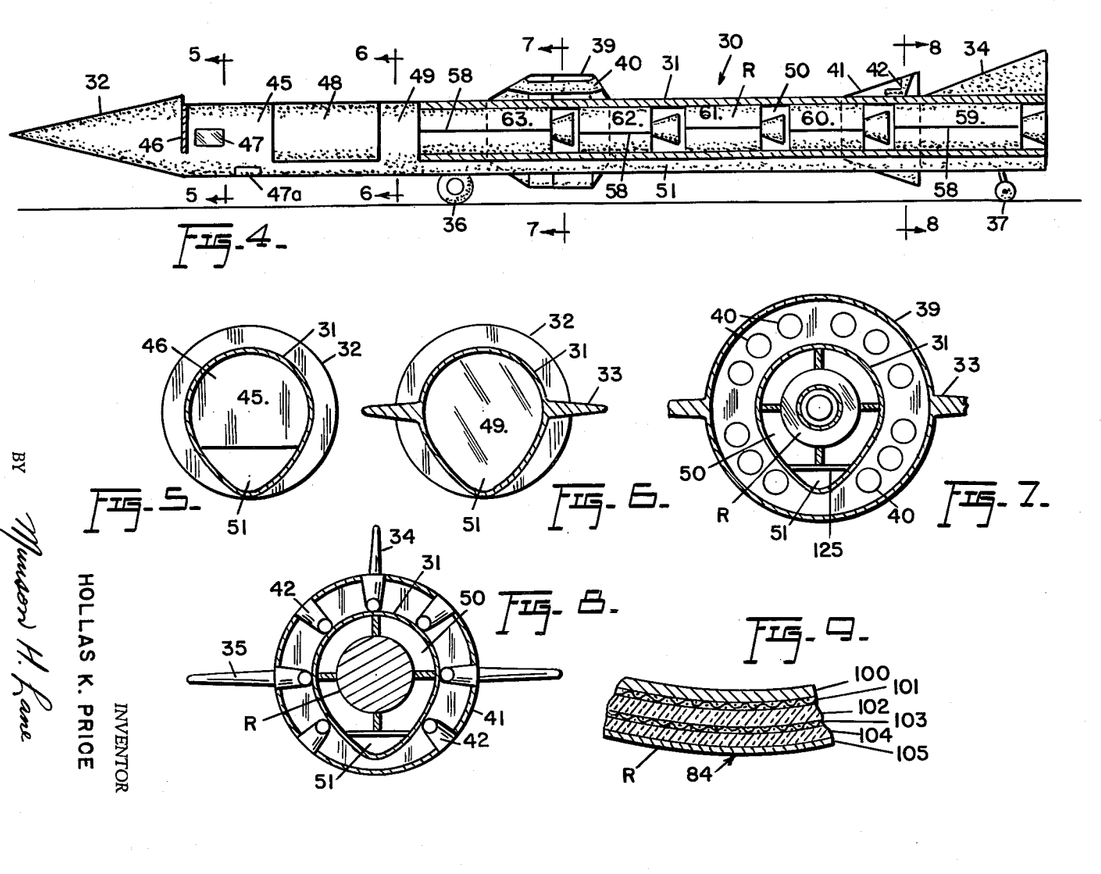
FIGURE 4 is a vertical, longitudinal sectional view.
FIGURE 5 is a cross-sectional view, taken substantially in the plane of the line 5—5 in FIGURE 4.
FIGURE 6 is a cross-sectional view, taken substantially in the plane of the line 6—6 in FIGURE 4.
FIGURE 7 is a cross-sectional view, taken substantially in the plane of the line 7—7 in FIGURE 4.
FIGURE 8 is a cross-sectional view, taken substantially in the plane of the line 8—8 in FIGURE 4.
FIGURE 9 is a fragmentary, enlarged sectional detail, showing the construction of the rocket engine casing.

As is best shown in FIGURE 4, the forward portion of the fuselage 31 contains a cockpit 45 in which living quarters may also be provided. The cockpit is separated from the nose cone 32 by a bulkhead 46 and is provided with observation windows 47 and with an entrance hatch 47a. Provided in the fuselage aft of the cockpit 45 is a storage tank 48 for jet fuel on which the jet engines 40, 43 and the steering jets 42 operate. Aft of the fuel tank 48 is a compartment 49 for mechanical and electrical equipment such as pumps, generators, air conditioners, and the like. For most part, however, the length of the fuselage 31 is taken up by a rocket engine compartment 50 which is open at the tail end of the fuselage and contains a plurality of individual, expendable rocket engines designated generally by the reference character R.

Finally, with regard to the fuselage structure, it will be noted that an elongated passage 51 extends longitudinally along the full length of the underside of the fuselage and communicates at its forward end with the cockpit 45, whereby the cockpit crew may gain access to any portion of the fuselage while the craft is in flight. The rear end of the passage 51 is closed as shown in FIGURE 10B.

With particular reference now to FIGURES 10A, 10B and 11–14, it will be noted that the several rocket engines R are disposed in a row extending longitudinally in the fuselage compartment 50. The engines are substantially smaller in diameter than the compartment and are slidable along a set of guides 52, 53, 54, 55 which are spaced circumferentially from each other and extend the full length of the compartment 50. Although only four such guides spaced at 90° are shown, additional guides may be used if so desired. Each of the guides 53, 54, 55 is provided with a pair of spaced parallel grooves 56, 57 which, in a manner now to be described, slidably receive longitudinal ribs 58 provided on the outer surface of the rocket engines R. Assuming each rocket engine to be provided with four such ribs, one for each of the four guides 52, 53, 54, 55, the ribs on each engine are spaced apart by 90°, but are slightly offset laterally from the longitudinal center lines of the guides, so that the ribs on one rocket engine may slidably fit the grooves 56 of the guides, while those on another rocket engine may fit the grooves 57. This arrangement is alternated for the successive engines in the row, so that if, as exemplified in FIGURE 4, the compartment 50 contains a row of five engines 59, 60, 61, 62, 63, the ribs 58 of the engines 59, 61 and 63 may slide in the guide grooves 56, while those of the engines 60 and 62 slide in the guide grooves 57. The purpose of this arrangement will be hereinafter described.

The guide 52 is not provided with grooves but merely consists of a pair of spaced parallel straps 64 which are spaced apart sufficiently to receive therebetween the ribs 58 on the engines 59, 61, 63, as well as those on the engines 60, 62. The straps 64 also receive therebetween an endless sprocket chain 65 which extends longitudinally within the guide 52 and passes over a set of sprockets 66 mounted on shafts 67 which are journalled in the straps 64, as will be clearly apparent. A plurality of cross pins 68 are affixed at intervals to the chain 65 and are receivable in recesses 69 formed in the ribs 58 of the rocket engines which run in the guide 52. As will be noted, the pins 68 are long enough to enter recesses in the ribs which are offset to either or the other side of the longitudinal center line of the guide 52. The shaft 67 of one of the sprockets 66 is connected by a universal joint 70, or the like, to a reduction gear box 71 of an electric motor 72 which may be mounted in the fuselage compartment 50 as exemplified in FIGURE 11, so that driving of the chain 65 may be effected, with the lower run of the chain travelling rearwardly toward the tail end of the fuselage. When the chain is so driven, the rearmost rocket engine 59 in the row will be ejected outwardly through the open rear end of the compartment 50 and simultaneously, the row of engines will be slid rearwardly in the compartment so that the next engine 60 assumes its position at the tail end of the fuselage, this being subject to repetition until the engine 63 assumes that position and is ultimately ejected.

Figure 10A:
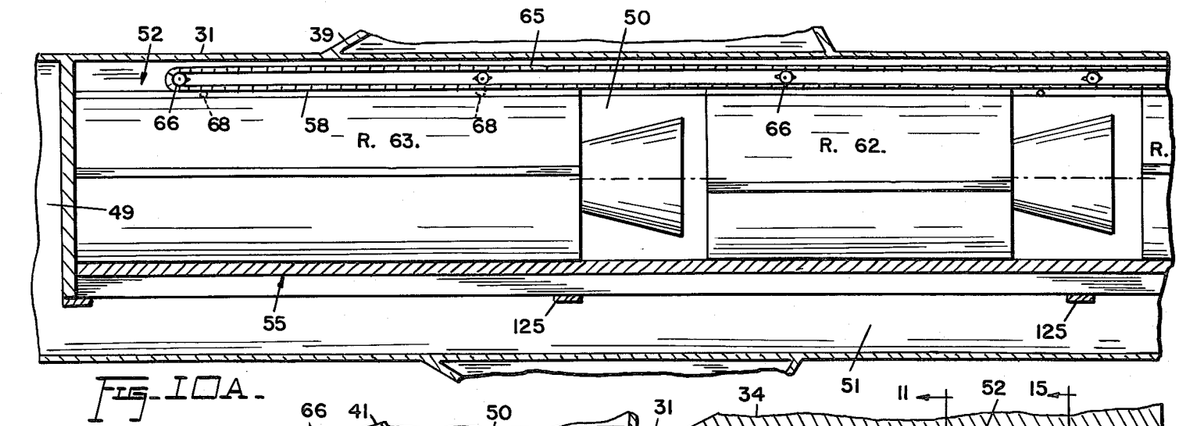
FIGURE 10A is an enlarged, fragmentary vertical longitudinal sectional view of the amidships portions of the fuselage.
Figure 10B:
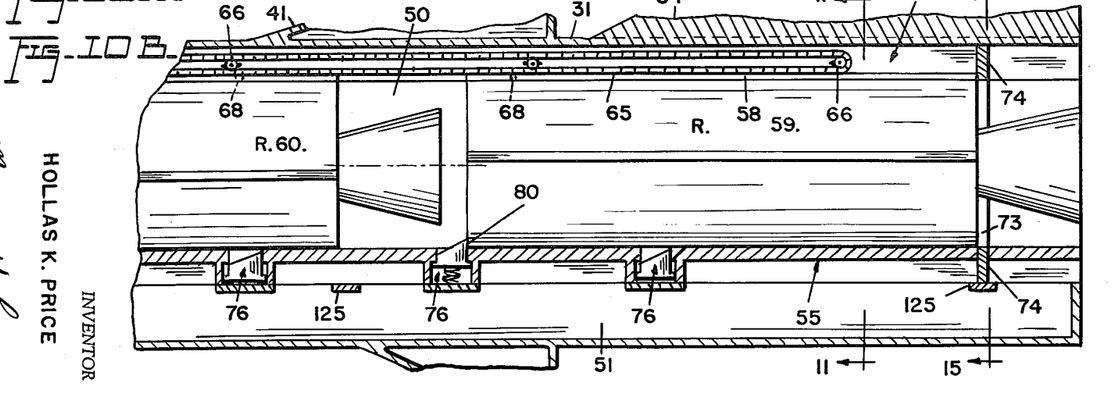
FIGURE 10B is a similar view of the tail portion of the fuselage.
Figure 11:
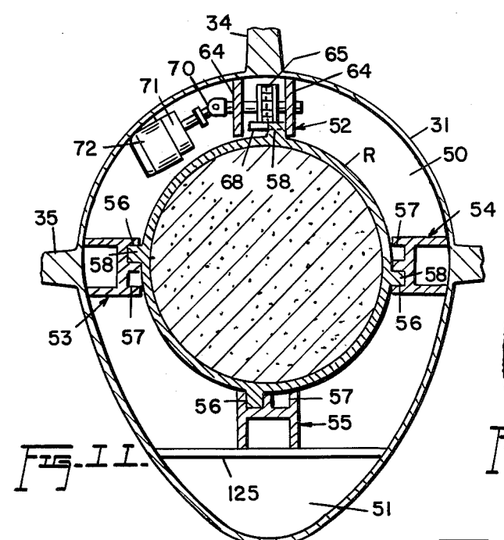
FIGURE 11 is an enlarged cross-sectional view, taken substantially in the plane of the line 11—11 in FIGURE 10B.
Figure 12:
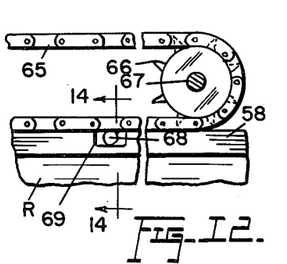
FIGURE 12 is an enlarged, fragmentary side view of the rocket engine chain drive.
Figure 13:
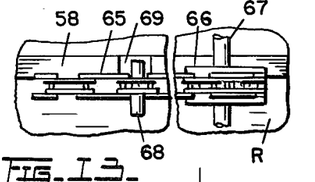
FIGURE 13 is a top plan view of the subject shown in FIGURE 12.
Figure 14:
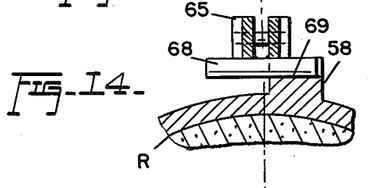
FIGURE 14 is a sectional detail, taken substantially in the plane of the line 14—14 in FIGURE 12.
Figure 15:
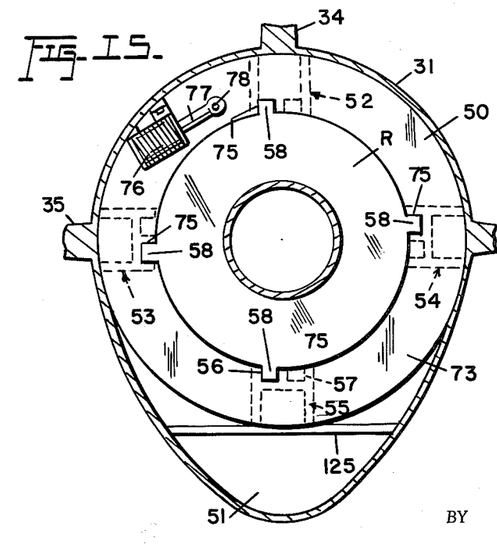
FIGURE 15 is an enlarged cross-sectional view, taken substantially in the plane of the line 15—15 in FIGURE 10B.
Figure 16:
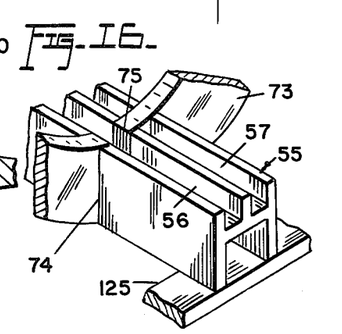
FIGURE 16 is a fragmentary perspective view of the rocket engine locking means.

The rocket engines are safeguarded against accidental ejection from the compartment by a locking ring 73 which is rotatably mounted in the tail end portion of the compartment 50 in transverse slots 74 formed in the several guides 52, 53, 54, 55, as shown in FIGURES 10B, 15 and 16. As illustrated, the inner edge of the ring 73 is provided with four notches 75 which are registrable selectively with the guide grooves 56, 57, in other words, by partially rotating the ring 73, the notches 75 may be brought to register with either the grooves 56 or the groves 57 of the guides. Partial rotation of the ring 73 is effected by a double-acting fluid operator or a spring-biased solenoid 76 which is suitably mounted in the compartment 50 and has its piston or armature 77 connected to the ring 73 as at 78, so as to shift the ring from either position to the other. As illustrated in FIGURE 15, the ring notches 75 are in register with the guide grooves 56 which contain the ribs 58 of the rocket engine R disposed immediately forwardly of the locking ring. Thus, upon actuation of the chain 65, the rocket engine may be ejected outwardly through the open tail end of the compartment, while the ribs 58 of that engine slide through the guide grooves 56 and the aligned notches 75. However, the next succeeding rocket engine in the row has its ribs 58 disposed in the guide grooves 57, and since these guide grooves are blocked by the locking ring 73, the next engine will be prevented from being ejected until the locking ring is rotated to a position wherein the notches 75 are in alignment with the grooves 57. The same automatic locking procedure is repeated for all the other rocket engines in the row, due to the alternately offset or staggered arrangement of the ribs 58 as already mentioned.

It will be understood, of course, that each of the rocket engines R is ejected from the compartment 50 only after it has been fired and has delivered its thrust, and that only the rearmost engine is energized at one time, so that the several engines in the row are individually and successively usable. It may be noted at this point that the several rocket engines 59–63 may be of different sizes to provide different amounts of thrust for different periods of time. For example, the engine 59 may be relatively large to effect placing of the craft in its initial orbit or trajectory, the engines 60, 61 and 62 may be relatively small for use in effecting flight path changes while in space, while the engine 63 may be relatively large for returning the craft to the earth's atmosphere.

FIGURES 10B and 20–22 illustrate means which are provided for counteracting the thrust of the rearmost rocket engine when fired, so that such thrust is imparted to the craft for its forward propulsion. These means comprise a plurality of thrust abutment units designated generally by the numeral 76 which are provided at longitudinally spaced points in the guide 57. Each such unit consists of an abutment member 77 which is slidable in a socket 78 formed in the guide and is biased by a compression spring 79 so as to project into the guide grooves 56, 57 and abuttingly engage the front end of the rearmost rocket engine in the row, as indicated at 80 in FIGURE 10B. This prevents any tendency for the rocket engine to slide forwardly in the guides when it is fired, but it will be observed that the member 77 has a cam surface 81, so that when the rearmost engine is burned out and ejected and the next engine slides forwardly to assume its place, the member 77 will be automatically depressed against the action of the spring 79 while the next engine slides over the member and assumes its firing position, at which time the spring 79 will force the member 77 into thrust reacting abutment with the engine, as at 80. Several of the thrust abutment units 76 are provided at longitudinally spaced points in order to engage rocket engines of different lengths, as already mentioned.

Figures 20, 21:
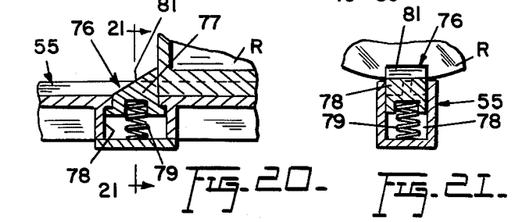
FIGURE 20 is an enlarged, fragmentary sectional detail of one of the rocket engine thrust abutments.
FIGURE 21 is a fragmentary sectional view, taken substantially in the plane of the line 21—21 in FIGURE 20.
Figure 22:
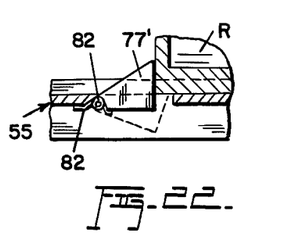
FIGURE 22 is a view, similar to that shown in FIGURE 20, but illustrating a modified form of the abutment.

FIGURE 22 shows a modified arrangement of the thrust abutment unit illustrated in FIGS. 10B, 20 and 21, wherein the abutment member 77' is pivotally mounted as at 82, rather than being slidable, and is biased to its engine abutting position by a coil spring 83. Otherwise, the operation of this modified arrangement is the same as already described.

Figures 23, 25, 26:
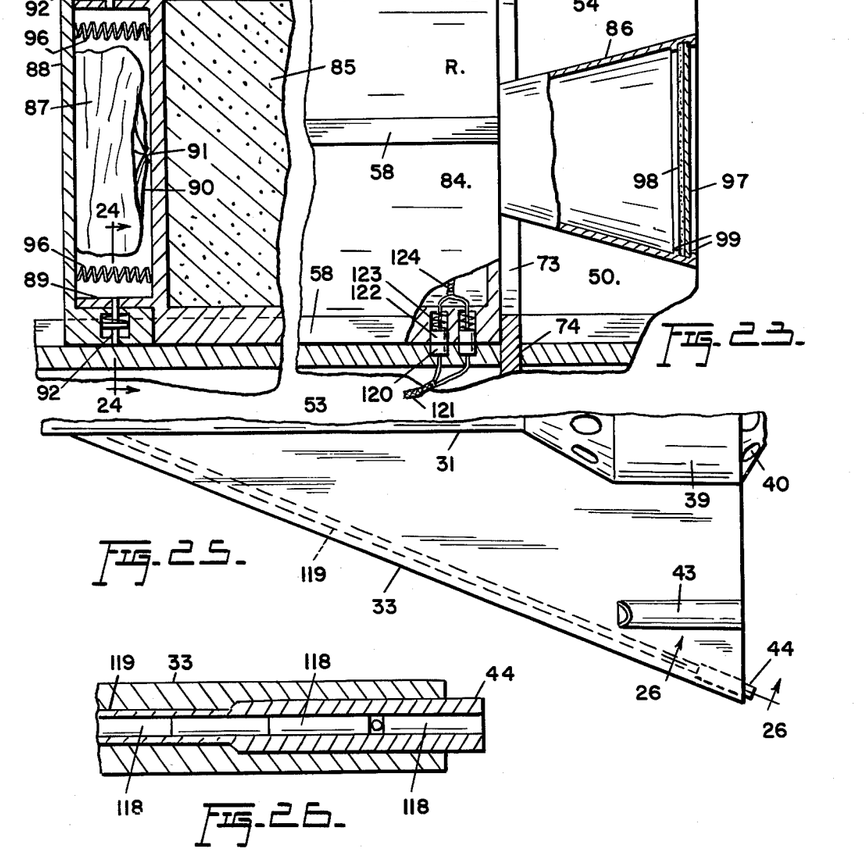
FIGURE 23 is an enlarged, fragmentary view, partly in vertical section and partly in side elevation, showing the parachute compartment of one of the rocket engines.
FIGURE 25 is an enlarged, fragmentary plan view of the port side of the wing.
FIGURE 26 is an enlarged, fragmentary sectional view, taken substantially in the plane on the line 26—26 in FIGURE 25 and showing one of the steering rocket guns.
Figure 24:
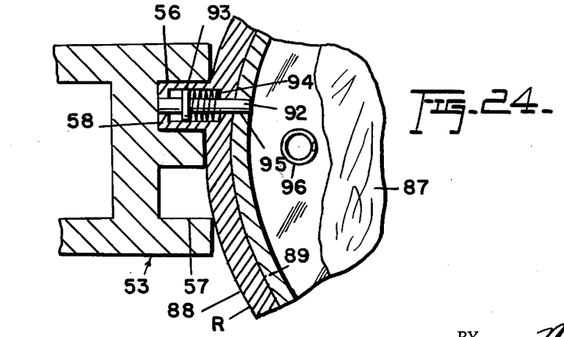
FIGURE 24 is an enlarged, fragmentary sectional detail, taken substantially in the plane of the line 24—24 in FIGURE 23.

Referring now to FIGURES 23 and 24, each of the rocket engines R consists of a tubular casing 84 containing suitable rocket fuel, preferably solid fuel 85, which is burned and discharged through a frusto-conical outlet nozzle 86. The ribs 58, of course, are provided on the outer, lateral surface of the casing, and if desired, each rocket engine may be equipped with a parachute 87 for lowering the burned out and ejected engine casing to the ground in instances where such a procedure may be necessary. For this purpose, a flanged cover 88 is provided to accommodate the parachute, the cover 88 forming the front end portion of the rocket engine as an extension of the casing 84, the casing being provided with an annular shoulder 89 over which the flanged cover is fitted. The cords 90 of the parachute 87 are anchored to the engine casing as indicated at 91 and it will be noted that the parachute is folded in a compact form within the shoulder 89 equipped with the cover 88. The cover 88 is retained in position by a pair of pins 92 which are slidably disposed in the ribs 58 which slide in the two side guides 53, 54. The pins 92 are equipped with shoulders 93, spring-pressed by compression springs 94 in an outward direction, so that the outer ends of the pins contact the bottom of the guide grooves 56, 57, as the case may be, while the inner end portions of the pins extend into apertures 95 provided in the flange or shoulder 89 of the casing 84. Compression springs 96 are interposed between the casing 84 and the cover 88, but they cannot force the cover off the casing as long as it is held in place by the engagement of the pins 92 in the apertures 95. This engagement is maintained as long as the rocket engine remains in the compartment 50, but when it is burned out and ejected therefrom as already described, the guides 53, 54 no longer hold the pins 92 inwardly, and the pins are forced outwardly by the springs 94 so that they are withdrawn from the apertures 95. When this occurs, separation of the cover 88 from the casing 84 by the springs 96 is facilitated to effect releasing of the parachute 87.

As will be apparent from the right-hand portion of FIGURE 23, the outlet nozzle 86 of each rocket engine may be provided with a safety closure plate 97, backed by a small explosive charge 98 of magnesium, or the like, and normally held between a pair of annular shoulders 99 inside the nozzle. The closure plate 97 safeguards against any possibility of a fired rocket engine igniting the next engine in the row of engines in the compartment 50. However, when a particular rocket engine assumes its operative position at the tail end of the fuselage and is ready to be fired, the explosive charge 98 is ignited by remote control from the cockpit, so as to blow out the closure plate 97. As a further safeguard against accidental firing of rocket engines in the compartment 50, the casing 84 of each engine is especially constructed to minimize outward dissipation of heat, such construction being illustrated in FIGURE 9 wherein the rocket engine casing 84 is shown as consisting of an inner metallic wall 100, covered by a wire mesh 101, in turn covered by a layer of insulating material 102, another wire mesh 103, then by another insulating layer 104 and finally, by an outer metallic shell 105.

It is understood, of course, that only the rearmost rocket engine in the compartment 50 is subject to firing, while those forwardly thereof are in storage for individual, successive feeding by the chain 65 to the firing position at the rear end of the compartment as the rearmost engine is burned out and ejected. As shown in FIGURE 23, one of the guides, such as for example the guide 53, is provided adjacent the rear end of the compartment 50 with a pair of electrical contacts 120 which are insulated from each other and connected by a conductor 121 to a rocket engine firing switch (not shown) in the cockpit. The casing 84 of each rocket engine is provided adjacent the outlet nozzle 86 with a pair of similar contacts 122 which are pressed by suitable springs 123 against the contacts 120 when the rocket engine assumes its firing position at the rear end of the fuselage, that is, in abutment with the locking ring 73. The contacts 122 are connected by a conductor 124 to the engine firing mechanism (not shown) inside the rocket engine, so that when the firing switch in the cockpit is closed, the rocket engine is energized. Since the contacts 120 are provided only at one location, that is, at the rear end of the compartment 50, they are engageable only with the contacts 122 of the rearmost engine in the compartment so that only the rearmost engine can be fired.

It may be mentioned at this point that while the engine guides 52, 53 and 54 may be mounted directly on the inside wall of the fuselage 31, the guide 55 may be supported at longitudinally spaced points by a plurality of cross members 125, spanning the lower portion of the fuselage above the passage 51.

Figures 17, 18, 19:
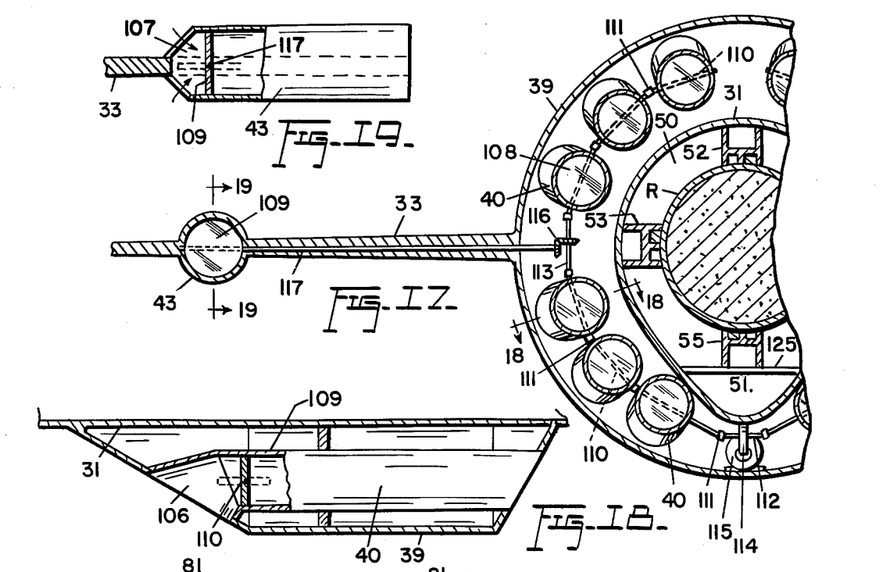
FIGURE 17 is an enlarged, fragmentary sectional view, taken substantially in the plane on the line 17—17 in FIGURE 2.
FIGURE 18 is a fragmentary sectional view, taken substantially in the plane of the line 18—18 in FIGURE 17.
FIGURE 19 is a fragmentary sectional view, taken substantially in the plane of the line 19—19 in FIGURE 17.

Referring now to FIGURES 17–19, it will be observed that the air intakes 106 and 107 of the jet engines 40 and 43, respectively, are provided with dampers or shutters 108, 109, respectively, so that the intakes may be closed to prevent the jet engines from freezing when the craft is operating in space and the jet engines are not being utilized for propulsion. The shutters 108 of the several engines 40 are mounted on individual shafts 110 which are operatively connected together by universal joints 11. The string of the universally jointed shafts also includes intermediate shafts 112, 113, the shaft 112 being driven from a reduction gear box 114 by an electric motor 115 in the engine nacelle 39.

The shaft 113, disposed one on each side of the fuselage, are connected by gearing 116 to operating shafts 117 for the shutters 109 of the engines 43, and it will be understood from the foregoing that when the motor 115 is energized, all of the shutters 108 of the engines 40 and the shutters 109 of the engines 43 may be simultaneously opened or closed. If desired, a similar shutter arrangement may be provided for the air intakes of the steering jets 42 in the jet casing 41.

Finally, FIGURES 25 and 26 illustrate the steering rocket guns 44 which are provided at the trailing edge of the wing 33 and are adapted to receive and fire, in an individual, successive manner, a set of thrust producing rockets 118, stored in tubular magazines 119 extending inside the leading edges of the wing. Any suitable mechanism may be provided for feeding and succesively firing the rockets 118 from the guns 44, to steer the craft while in flight through space.

*Operation*

When the craft is to be launched, the jet engines 40, 43 are energized so that the craft takes off on its landing gear 36, 37, 38, in the manner of a conventional airplane, its flight being sustained by the wing 33 and tail empennage 34, 35 and its course oriented by the steering jets 42 which, by virtue of their circumferential distribution around the fuselage of the craft, are capable of guiding or steering the craft both in the horizontal and in the vertical plane. In addition, conventional elevators, rudder and ailerons, if provided, may be utilized.

After take off, the auxiliary landing gear unit 38 may be jettisoned, and when the craft reaches upper layers of the atmosphere, the jet engines 40, 43 may be shut off and, with the craft oriented on a desired orbital course or trajectory, the rearmost rocket engine 59 in the fuselage compartment 50 may be fired so as to boost the craft into the desired path of travel. At that point, the craft will continue along its intended path by the propulsional thrust of the rocket engine 59 and will be guided by a balance between centrifugal and gravitational forces acting thereon, so that the craft's travel along this path may continue as long as these forces exist. Some degree of attitude and directional control may be exercised by firing of the steering rocket guns 44, so that if desired, the nose of the craft may be deflected from its initial path toward assuming flight along another orbit or trajectory. In such event, another rocket powered boost will be required for propulsion purposes, and this will become available by simply ejecting the already fired and burned out rocket engine 59 and advancing the row of engines so that the next engine 60 takes its place. The engine 60 may then be fired and ejected, and the same procedure repeated with the engines 61 and 62, whenever a change in orbit or trajectory is desired. Ultimately, when the craft is to be returned to earth, the rocket engine 63 may be utilized to boost the craft out of its orbit or trajectory into the atmosphere, at which time the jet engines 40, 43 may again be energized and the craft, under engine power and sustentation of its wing and tail empennage, may be brought to the ground for a controlled landing on its landing gear 36, 37.

While in the foregoing there has been shown and described the preferred embodiment of the invention, various modifications may become apparent to those skilled in the art to which the invention relates. Accordingly, it is not desired to limit the invention to this disclosure, and various modifications may be resorted to, falling within the spirit and scope of the invention as claimed.

What is claimed as new is:

1. In a space craft, the combination of an elongated fuselage having a nose end and a tail end, wing means and tail empennage provided on said fuselage for sustaining the same in flight through the atmosphere, jet engine means for propelling the craft through the atmosphere, thrust producing means for steering the craft, and a plurality of successively usable and expendable rocket engines provided in and dischargeable from said fuselage for boosting the craft from upper atmospheric layers into space, for boosting the craft in space, and for re-entry of the craft into the atmosphere.

2. The craft as defined in claim 1 together with a landing gear carried by said fuselage.

3. The craft as defined in claim 1 wherein said jet engines include an annular nacelle surrounding said fuselage amidships, and a plurality of circumferentially spaced jet engines mounted in said nacelle.

4. The craft as defined in claim 3 wherein said jet engine means also include a plurality of jet engines carried by said wing means.

5. The craft as defined in claim 1 together with a permanent landing gear and a jettisonable landing gear carried by said fuselage.

6. The craft as defined in claim 1 wherein said thrust producing means include jet means and rocket means for steering the craft in the atmosphere and in space respectively.

7. The craft as defined in claim 1 wherein said fuselage has an open tail end, said rocket engines being slidably disposed in longitudinal alignment in the fuselage and jettisonable individually and successively through the open tail end thereof.

8. In a space craft, the combination of an elongated fuselage having a nose end and an open tail end, a plurality of expendable rocket engines slidably disposed in longitudinal alignment in said fuselage with the rearmost of said engines available for propulsion, and means for simultaneously sliding said engines rearwardly in the fuselage and jettisoning the rearmost engine through the open tail end thereof.

9. The craft as defined in claim 8 together with releasable means for locking the rearmost engine against jettisoning from the fuselage.

10. The craft as defined in claim 8 together with thrust reaction means provided in the fuselage for engagement with the rearmost engine.

11. The craft as defined in claim 8 together with a parachute carried by each of said engines, and means responsive to jettisoning of the engine from the fuselage for releasing said parachute.

12. In a space craft, the combination of an elongated fuselage having a nose end and an open tail end, wing means provided on said fuselage for sustaining the same in flight through the atmosphere, jet engine means for propelling the craft through the atmosphere, and rocket engine means for boosting the craft from upper atmospheric layers into space, for boosting the craft in space, and for re-entry of the craft into the atmosphere, said rocket engine means comprising a plurality of expendable rocket engines slidably disposed in longitudinal alignment in said fuselage with the rearmost of said engines available for propulsion, and means for simultaneously sliding said engines rearwardly in the fuselage and jettisoning the rearmost engine through the open tail end thereof.

13. In a space craft, the combination of a fuselage, wing means provided on said fuselage for sustaining the same in flight through the atmosphere, jet engine means for propelling the craft through the atmosphere, and a plurality of successively usable and expendable rocket engines provided in and dischargeable from said fuselage for boosting the craft from the upper atmospheric layers into space, for boosting the craft in space, and for re-entry of the craft into the atmosphere.

14. The craft as defined in claim 13 together with permanent landing gear and jettisonable landing gear carried by said fuselage.

15. The craft as defined in claim 13 wherein said fuselage has an open tail end, said rocket engines being slidably disposed in longitudinal alignment in the fuselage and jettisonable individually and successively through the open end thereof.

16. The craft as defined in claim 15 together with a parachute carried by each of said engines, and means responsive to jettisoning of the engine from the fuselage for releasing said parachute.

References Cited by the Examiner
UNITED STATES PATENTS

| | | | |
|---|---|---|---|
| 2,774,557 | 12/56 | Jakimiuk | 244—103 X |
| 2,833,493 | 5/58 | Pfarr | 244—54 |
| 3,001,739 | 9/61 | Faget | 244—1 |
| 3,041,016 | 6/62 | Heath | 244—54 |
| 3,053,476 | 9/62 | Mohar | 244—1 |
| 3,093,348 | 6/63 | Schelp | 244—2 X |
| 3,107,883 | 10/63 | Haberkorn | 244—34 X |

FOREIGN PATENTS 502,903   3/20   France.

MILTON BUCHLER, *Primary Examiner.*

RALPH D. BLAKESLEE, *Examiner.*